United States Patent
Baumgartner et al.

(10) Patent No.: US 12,509,030 B2
(45) Date of Patent: Dec. 30, 2025

(54) SENSOR ARRANGEMENT, ACTUATION DEVICE, MOTOR VEHICLE

(71) Applicant: Robert Bosch GmbH, Stuttgart (DE)

(72) Inventors: Andreas Baumgartner, Auenstein (DE); Bernd Lutz, Kempten (DE); Guenter Escher, Oberstdorf (DE); Juergen Kissner, Oppenweiler (DE); Manfred Fischer, Oppenweiler (DE); Martin Baeuml, Weitnau (DE); Masaya Eto, Oita (JP); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/510,931

(22) Filed: Nov. 16, 2023

(65) Prior Publication Data
US 2024/0166174 A1 May 23, 2024

(30) Foreign Application Priority Data

Nov. 22, 2022 (DE) .................... 10 2022 212 450.2

(51) Int. Cl.
*B60T 7/04* (2006.01)
*G01L 5/22* (2006.01)
*G05G 5/05* (2006.01)

(52) U.S. Cl.
CPC .............. *B60T 7/042* (2013.01); *G01L 5/225* (2013.01); *G05G 5/05* (2013.01)

(58) Field of Classification Search
CPC ...................................... G01L 5/225
See application file for complete search history.

(56) References Cited

U.S. PATENT DOCUMENTS 5,287,757 A * 2/1994 Polaert ............... G01L 1/26
                                                73/862.627
2016/0334829 A1* 11/2016 Kaijala ............... G05G 1/38

FOREIGN PATENT DOCUMENTS

| DE | 101 35 216 A1 | 5/2002 | |
|----|---|---|---|
| DE | 102 39 913 A1 | 3/2004 | |
| DE | 103 12 547 A1 | 10/2004 | |
| DE | 103 35 598 A1 | 2/2005 | |
| DE | 103 41 277 A1 | 3/2005 | |
| DE | 10 2012 222 108 A1 | 6/2014 | |
| DE | 10 2013 106 655 A1 | 1/2015 | |
| DE | 10 2017 119 392 A1 | 3/2018 | |
| DE | 10 2020 205 375 A1 | 10/2021 | |
| JP | H5-92656 U | 12/1993 | |
| WO | WO-2021155046 A1 * | 8/2021 | ............. G01L 1/044 |

* cited by examiner

*Primary Examiner* — Vicky A Johnson
(74) *Attorney, Agent, or Firm* — Maginot, Moore & Beck LLP

(57) ABSTRACT

A sensor arrangement for an actuation device of a motor vehicle is disclosed which has a force transfer element and which can be assigned or is assigned in particular to an actuating surface of the actuation device for transferring an actuating force applied to the actuation device, in particular on the actuating surface. The sensor arrangement further has a measuring head arranged in a printed circuit board. The measuring head has a measuring membrane. The measuring membrane has a force sensor element at one end and is assigned to the force transfer element at the other end, in particular abutting the force transfer element.

19 Claims, 2 Drawing Sheets

SENSOR ARRANGEMENT, ACTUATION DEVICE, MOTOR VEHICLE

This application claims priority under 35 U.S.C. § 119 to patent application no. DE 10 2022 212 450.2, filed on Nov. 22, 2022 in Germany, the disclosure of which is incorporated herein by reference in its entirety.

The disclosure relates to a sensor arrangement for an actuation device. In addition, the disclosure relates to an actuation device for a motor vehicle, in particular to specify a braking and/or acceleration request, with at least one such sensor arrangement, and a motor vehicle with at least one such actuation device.

BACKGROUND

From the prior art, it is known to detect an actuation of an actuation device for a motor vehicle which can be actuated by a driver using a sensor assigned to the actuation device. If the driver actuates the actuation device, a braking or acceleration request of the driver is in particular detected as a function thereof. For example, brake systems with electromechanical brake amplifiers are known that, together with a vehicle assistance system, in particular an electronic stability program (ESP), form a redundant brake-by-wire system, in which there is no mechanical connection from the actuation device to the brake system. A braking request is forwarded, for example, as a function of an actuation of the actuation device to an electromechanical actuator which is designed to carry out a pressure build-up in the braking system. Analogously, actuation devices for drive units, in particular with internal combustion engines and/or electric motors, are known from motor vehicles which are part of a drive-by-wire system without a mechanical connection to the drive unit. For example, an acceleration request is detected as a function of an actuation of the actuation device and forwarded to the drive unit. Due to the lack of mechanical coupling of the actuation devices to the brake system and/or the drive unit, it is possible to design such actuation devices which are stroke-free or with at least a low stroke of a few millimeters. The use of different measurement methods is known for detecting the actuation. For example, the disclosure documents DE 10 2017 119 392 A1, DE 102 39 913 A1, and DE 103 12 547 A1 each disclose stroke-free pedals as well as the detection of an actuation of a stroke-free pedal by means of strain gauges.

The disclosure document DE 103 41 277 A1 discloses a pedal device with strain gauges arranged at a deformation area of a leaf spring, wherein a return spring arrangement is supported at one end of the pedal and the deformation area. The disclosure document DE 103 35 598 A1 discloses a pedal device, wherein a plunger which can be actuated by the pedal is configured to abut a disc spring with a strain gauge for measuring the deformation of the disc spring. US 2016/0334829 A1 discloses a vehicle pedal, wherein a force is applied to an actuator and a strain gauge assigned to the actuator by a spring element when the pedal arm is pivoted. The disclosure document DE 10 2013 106 655 A1 discloses a brake actuation device, wherein an actuating force is directed via a plunger onto a membrane of a force sensor with strain gauges. Finally, the disclosure document DE 101 35 216 A1 discloses a thin-layer high-pressure sensor with strain gauges applied to a membrane layer.

SUMMARY

The sensor arrangement according to the disclosure has a force transfer element, in particular one which can be assigned or is assigned to an actuating surface of the actuation device, to transfer an actuation force applied to the actuation device, in particular on the actuating surface, and a measuring head arranged in a printed circuit board, that the measuring head has a measuring membrane, and that the measuring membrane has a force sensor element at one end and is assigned to the force transfer element at the other end, in particular abutting the force transfer element. A particularly advantageously simple and robust sensor arrangement for detecting the actuating force is thus created. In particular, a material thickness of the measuring membrane is selected such that the actuation force is directed directly onto the measuring membrane. The actuation device then does not have a discernible actuation path for a user because the deformation of the measuring head with the measuring membrane is only a few micrometers to millimeters. The actuation device is then configured in this respect as a stroke-free or at least largely stroke-free actuation device.

According to a preferred further development of the disclosure, it is provided that the force sensor element has a strain gauge arrangement, in particular sputtered onto the measuring membrane and/or designed as a full bridge arrangement. With such a use of a strain gauge arrangement, the advantages of the sensor arrangement according to the disclosure are particularly pronounced. The measuring membrane with the strain gauges functions in this respect like a bending beam. The strain gauge assembly is in particular designed at least as a half bridge, preferably as a full bridge. In such strain gauges, resistance meanders are stretched or compressed by pulling and pushing, thereby changing their electrical resistance. This change is electrically amplified and evaluated, and is assigned to a force value by calibration. Compared to bonded strain gauges, sputtering has the advantage of higher sensitivity to moisture and reliably prevents delamination.

Particularly preferably, it is provided that the force transfer element is configured as a pin. By configuring the force transfer element as a pin, it is advantageously ensured that the actuation force is particularly easily and directly transferred to the measuring membrane.

According to a preferred further development of the disclosure, it is provided that the force transfer element is slidably guided in a first flange. Such an arrangement of the force transfer element in the flange advantageously ensures that the force transfer element is securely guided axially and that actuation of the actuation device is securely transferred to the measuring diaphragm at all times.

Particularly preferably, it is provided that the first flange is configured to be fixedly arranged in an opening of a partition wall of the actuation device and connected to the partition wall in a form-fit, force-fit and/or material-fit manner. Such a configuration of the first flange provides a particularly advantageous way of securely holding the sensor arrangement in the actuation device. In this respect, the first flange serves to fix the sensor arrangement to the actuation device.

According to a preferred further development of the disclosure, it is provided that the measuring head is connected to the printed circuit board and/or to the first flange in a form-fit, force-fit and/or material-fit manner. Such a connection of the measuring head provides a particularly advantageous way of inserting the sensor arrangement at least partially as a pre-assembled unit into the actuation device. Preferably, the measuring head is laser welded, alternatively, it is connected to the printed circuit board and/or the first flange by crimping, gluing, spot welding, resistance welding, pressing in, caulking, and/or clamping.

It is particularly preferably provided that the sensor arrangement has a spring element assigned to the force transfer element, and that the force transfer element is held biased in the direction of the measuring membrane by the spring element. The spring element provides the advantage that each actuation of the actuation device is reliably detected by the force transfer element. The spring element also serves as an advantageous overload protection for force decoupling from the actuating force as an input signal to the force transfer element. Thus, the spring element converts a particular actuation travel of the actuation device into a defined force, which is, for example, linear to the actuation travel. If a plurality of sensor arrangements is provided for parallel detection of the actuation in the actuation device, the spring element is also advantageously used for tolerance compensation.

According to a preferred further development of the disclosure, it is provided that the spring element is configured as a coil spring, that the coil spring can be assigned or is assigned at one end of the actuating surface and is arranged at the other end on a second flange. Such an arrangement and configuration as a coil spring ensures that an actuating force applied to the actuating surface is transferred to the force transfer element in a particularly advantageous simple geometric manner.

Particularly preferably, it is provided that the force transfer element lies at one end in the second flange and is assigned to the other end of the measuring membrane, in particular abutting the measuring membrane. Such an arrangement of the force transfer element has the advantage that it reliably transfers an actuating force applied to the actuating surface to the measuring diaphragm at all times.

According to a preferred further development of the disclosure, it is provided that the first and the second flange have a predetermined distance to each other for specifying a maximum displacement path of the force transfer element. This achieves a particularly advantageous, geometrically simple option for defining the actuation characteristic of the actuation device in the form of a maximum stroke.

Particularly preferably, it is provided that the measuring head is cup-shaped and comprises a recess for at least receiving the force transfer element in regions. Such a configuration of the measuring head provides the advantage that the force transfer element is reliably guided in the measuring head at all times. In addition, this creates an advantageous seal for the measuring membrane against contamination from environmental factors, for example dust and moisture. The force transfer element can thus transfer the actuating force to the measuring membrane without having to seal itself. This advantageously minimizes frictional influences.

The actuation device according to the disclosure is characterized by at least one sensor arrangement according to the disclosure. This results in the aforementioned advantages.

According to a preferred further development of the disclosure, it is provided that the actuation device has a first and a second housing portion, that the first housing portion is slidably mounted on the second housing portion in a vertical extension of the second housing portion, that the first housing portion has an actuating surface on a top side facing away from the second housing portion, or that a cover with the actuating surface is arranged on the top side, and that the sensor arrangement is arranged in the second housing portion. A particularly advantageous arrangement for the sensor arrangement is thus achieved, in which the advantages of the sensor arrangement according to the disclosure are particularly pronounced.

Particularly preferably, it is provided that a partition wall is configured or arranged in the second housing portion, that the force transfer element is slidably guided in a first flange, and that the first flange is fixedly arranged in an opening of the partition wall, sealing the opening, and is connected to the partition wall in a form-fit, force-fit and/or material-fit manner. This results in the advantage that the sensor arrangement is securely held in the actuation device. In particular, the partition wall forms a chamber with the second housing portion to enclose at least one component of the sensor arrangement in a media-tight manner. This ensures that the component in the chamber is particularly advantageously protected from environmental influences. This is particularly advantageous if the component is moisture sensitive. Within the second housing part which is configured, for example, as a lower housing portion, an advantageous seal is thus created between the component located in the chamber and an area between an inner side of the first housing portion configured as an upper housing portion, and the partition wall, wherein components that are less sensitive to moisture, for example, can be arranged or are arranged in the area. A separation of electronic and mechanical components of the sensor arrangement for protecting the electronic components from moisture, for example, is provided. The opening then particularly advantageously ensures that the mechanical and electronic components of the sensor arrangement are separated from each other by the partition wall in a media-tight manner, but are simultaneously operatively connected to each other. In particular, it is provided that there is an electronics area on a side of the partition wall facing away from the first housing portion, in which at least one electronic component of the sensor arrangement is arranged. Preferably, at least one illumination device, in particular a light emitting diode, is arranged in the electronics area. Particularly preferably, the electronic component and the illumination device are arranged on a common printed circuit board. Particularly preferably, on a side of the partition wall facing the first housing portion, a mechanical area is provided between the partition wall and the first housing portion, in which at least one mechanical component of the sensor arrangement is arranged. For example, a circumferential, in particular bellows-like, sealing element is arranged between the first and second housing portions to seal the mechanical area against an area outside the housing portions. The partition wall also ensures an immersion tightness. Preferably, the partition wall is arranged at least in regions, in particular completely, parallel and spaced apart from the actuating surface.

The motor vehicle according to the disclosure is characterized by at least one actuation device according to the disclosure. This also results in the advantages already mentioned.

BRIEF DESCRIPTION OF THE DRAWINGS

Further preferred features and combinations of features result from what has been described above and from the claims. The disclosure is explained in more detail below with reference to the drawings. The figures show:

DETAILED DESCRIPTION

Figure 1:
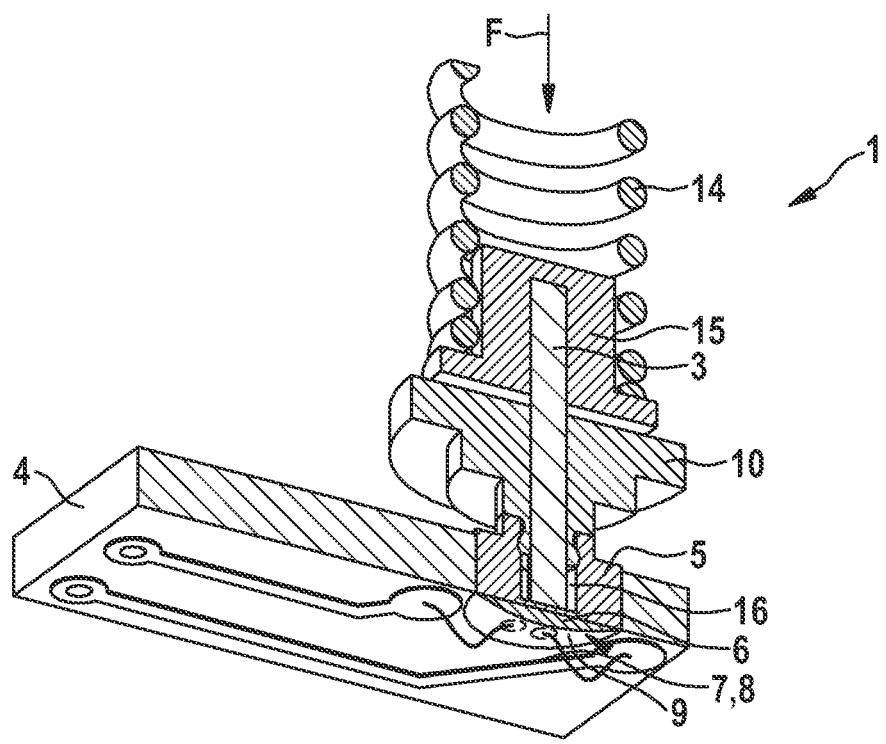
FIG. 1 an advantageous sensor arrangement,
FIG. 2 the sensor arrangement in an actuation device, and
FIG. 3 the actuation device with the sensor arrangement.

FIG. 1 shows a sensor arrangement 1 for an actuation device 2 of a motor vehicle, wherein the latter is described in detail with reference to FIG. 3. The sensor arrangement 1 has a force transfer element 3 configured as a pin for transferring an actuating force F applied to the actuation device 2. Furthermore, the sensor arrangement 1 comprises a printed circuit board 4 and a measuring head 5 arranged in the printed circuit board 4.

The measuring head 5 has a measuring membrane 6. The measuring membrane 6 comprises a force sensor element 7 at one end and is assigned to the force transfer element 3 at the other end. In the present case, the measuring membrane 6 abuts the force transfer element 3. In this case, the force sensor element 7 has a strain gauge arrangement 8 which is sputtered onto the measuring membrane 6 and designed as a full bridge arrangement. The strain gauge assembly is electrically contacted with the printed circuit board 4 by corresponding electrical contacts, in particular bonding terminals. To protect against external influences, the strain gauge assembly 8 is protected by a gel layer 9.

Figure 2:
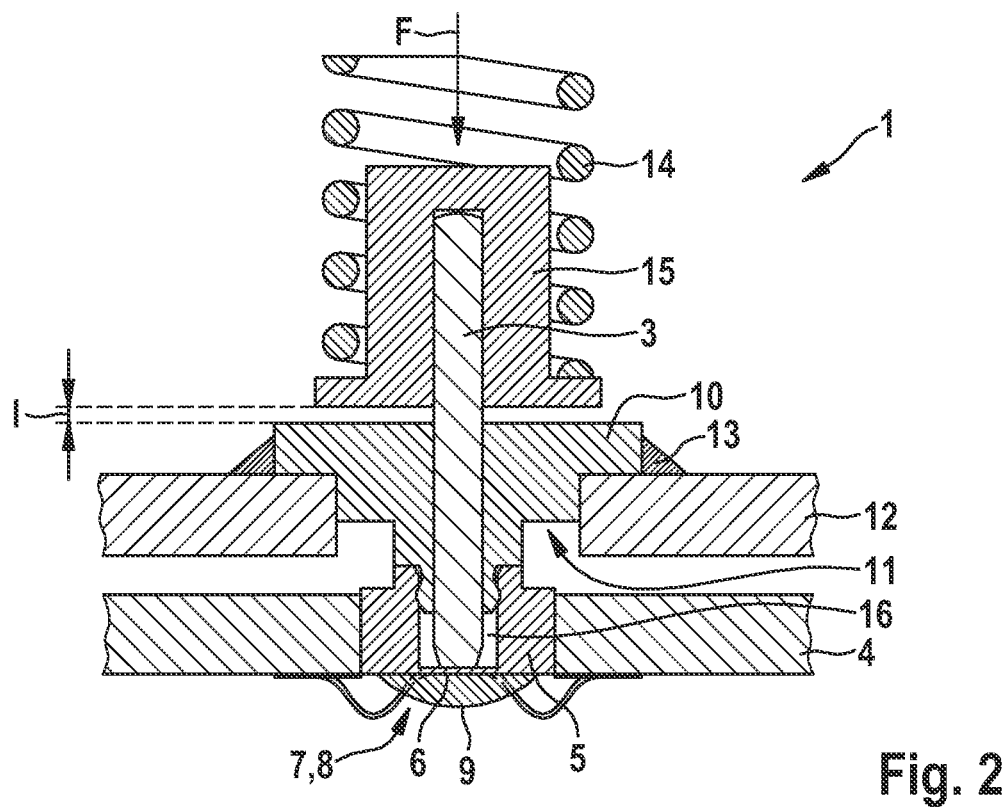

The force transfer element 3 is slidably guided in a first flange 10. The first flange 10 is configured to be fixedly arranged in an opening 11 of a partition wall 12 of the actuation device 2, sealing the opening 11, and to be connected to the partition wall 12, in a form-fit, force-fit and/or material-fit manner. This is shown in FIG. 2. By way of example, an adhesive layer 13 is shown connecting the first flange 10 to the partition wall 12. The measuring head 5 is also connected to the printed circuit board 4 and the first flange 10 in a form-fit, force-fit and/or material-fit manner. Alternatively, the measuring head 5 is only arranged in a recess in the printed circuit board 4, i.e., it passes through the printed circuit board 4 without being directly connected to it itself.

Furthermore, the sensor arrangement 1 also has a spring element 14 assigned to the force transfer element 3, in the present case configured as a coil spring. The force transfer element 3 is held biased in the direction of the measuring membrane 6 by the spring element 14. For this purpose, the spring element 14 can be assigned or is assigned to one end of an actuating surface of the actuation device 2 and is arranged at the other end on a second flange 15. The force transfer element 3 lies at one end in the second flange 15 and is assigned to the other end of the measuring membrane 6. In the present case, it abuts the measuring membrane 6.

The first and the second flanges 10, 15 have a predetermined distance 1 to each other for specifying a maximum displacement path of the force transfer element 3. In the present case, the measuring head 6 is cup-shaped and comprises a recess 16 for at least receiving the force transfer element 3 in regions.

Figure 3:
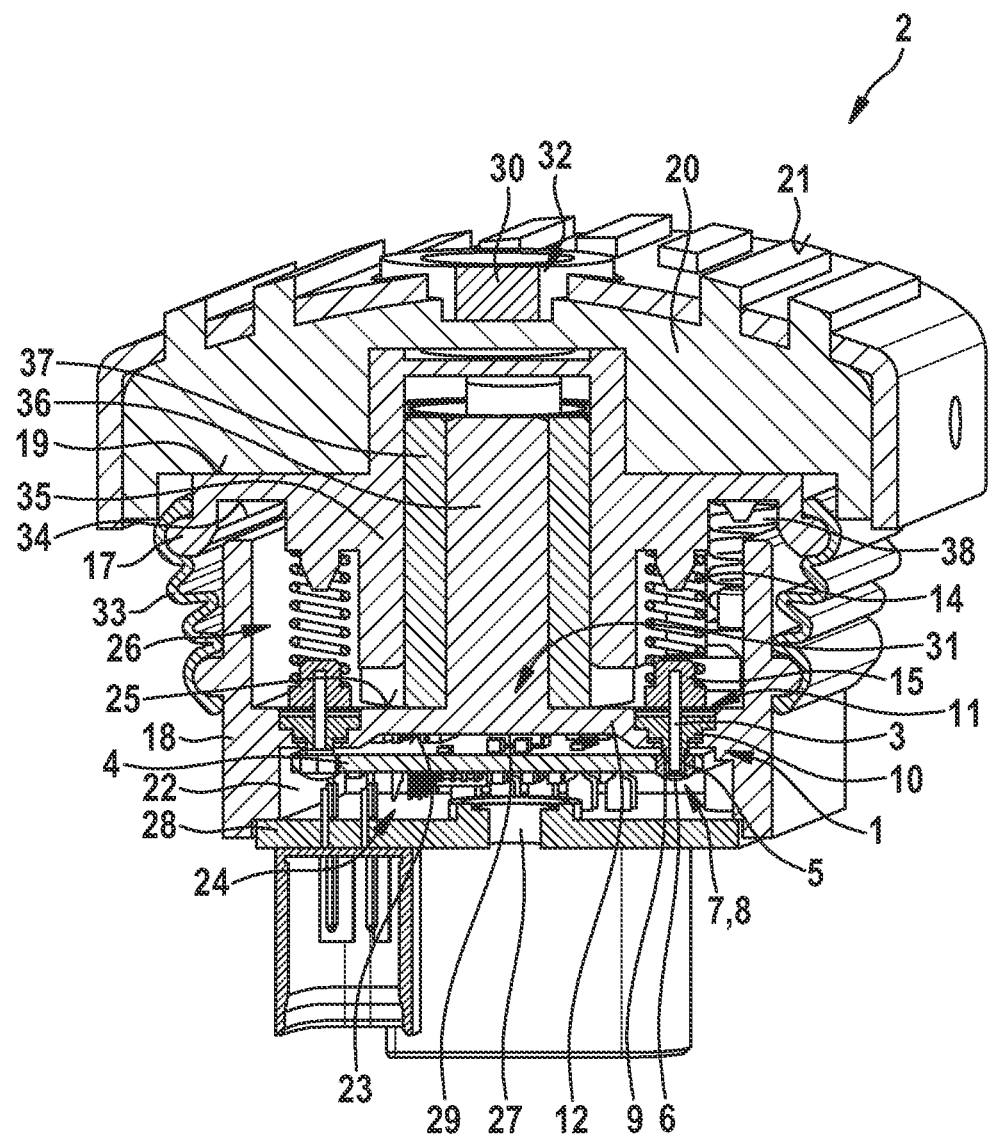

Finally, in FIG. 3, the sensor arrangement 1 is shown in the actuation device 2. The actuation device 2 is in particular configured to specify a braking and/or an acceleration request, and can in particular be arranged or is arranged in the footwell of the motor vehicle. In the present case, the sensor arrangement 1 is provided in duplicate, but for reasons of clarity only one of the components is marked with a reference numeral in FIG. 3.

The actuation device 2 comprises a first housing portion 17 and a second housing portion 18. The first housing portion 17 is slidably mounted on the second housing portion 18 in a vertical extension of the second housing portion 18. The first housing portion 17 comprises a cover 20 with an actuating surface 21 on a top side 19 facing away from the second housing portion 18. Alternatively, the first housing portion 18 has the actuating surface 21 directly on the upper side 19, in particular it is formed integrally therewith.

In the second housing portion 18, the sensor arrangement 1 is arranged for detecting an actuation of the actuation device 2, in the present case an actuation force applied to the actuation surface 21. Furthermore, the partition wall 12 is arranged in the second housing portion 18, in the present case configured integrally with the second housing portion 18, in particular molded into the housing portion 18. The partition wall 12 is arranged completely parallel to the actuating surface 21 and forms a chamber 22 with the second housing portion 18, in order to enclose the printed circuit board 4 with the components arranged therein and thereon, in particular the measuring head 5 with the measuring membrane 6 and the force sensor element 7 in a media-tight manner.

The first flange 10 is fixedly arranged in the opening 11 of the partition wall 12 and connected to the partition wall 12. In the present case, the opening 11 is geometrically configured to correspond with the first flange 10. In the chamber 22, which is located on a side 23 of the partition wall 12 facing away from the first housing portion 17, an electronics area 24 is provided. On one side 25 of the partition wall 12 facing the first housing portion 17, a mechanical area 26 is provided between the partition wall 12 and the first housing portion 17, in which in particular the spring element 14 and the second flange 15 are arranged.

In the present case, a pressure compensation element 27, for example configured as a membrane, and a cover 28 sealing the electronics area 24 are arranged on the second housing portion 18 in the electronics area 24, which in the present case is arranged on an underside of the second housing portion 18 and which serves as a holder for the actuation device 1 as a whole. Furthermore, an illumination device 29, in the present case as a light-emitting diode, is arranged in the electronics area 24. The illumination device 29 is also arranged on the printed circuit board 4.

In the housing portions 17, 18, a light guiding element 30 for the illumination device 29 is also arranged, which extends from the illumination device 29 through a first (non-visible) opening 31 in the partition 12 to a second opening 32 in the actuating surface 21. The illumination device 29 is designed as a light-emitting diode, in particular monochrome, or has an RGB control. A circumferential, in particular bellows-like, sealing element 33 is arranged between the first and second housing portions 17, 18 to seal the mechanical area 26 against an area outside the housing portions 17, 18. In FIG. 3, the sealing element 33 abuts on the outside of the housing portions 17, 18.

Finally, the first housing portion 17 comprises a bar-shaped projection 35 on an inner side 34 facing the second housing portion 18. The second housing portion 18 comprises a guide receptacle 36 for the projection 35 for the guided, slidable mounting of the first housing portion 17 on the second housing portion 18. In the present case, the projection 35 features a circular cross-section and is designed as a hollow cylinder. A sliding bearing element 37 is arranged within the projection 35. In addition, at least one further spring element 38, in the present case configured as a coil spring, is arranged as a return spring between the housing portions 17, 18 in FIG. 3.

What is claimed is:

1. A sensor arrangement for an actuation device of a motor vehicle, comprising:
   a force transfer element configured to transfer an actuating force applied to the actuation device;
   a printed circuit board; and
   a measuring head arranged in the printed circuit board, wherein the measuring head has a measuring membrane, and wherein the measuring membrane has a force sensor element at a first end and is assigned to the force transfer element at a second end.

2. The sensor arrangement according to claim 1, wherein the force sensor element comprises a strain gauge arrangement.

3. The sensor arrangement according to claim 1, wherein the force transfer element is configured as a pin.

4. The sensor arrangement according to claim 1, further comprising a first flange, wherein the force transfer element is slidably guided in the first flange.

5. The sensor arrangement according to claim 4, wherein the first flange is configured to be fixedly arranged in an opening of a partition wall of the actuation device and connected to the partition wall in a form-fit, force-fit and/or material-fit manner.

6. The sensor arrangement according to claim 4, wherein the measuring head is connected to the printed circuit board and/or to the first flange in a form-fit, force-fit and/or material-fit manner.

7. The sensor arrangement according to claim 4, wherein:
the sensor arrangement has a spring element assigned to the force transfer element, and
the force transfer element is held biased by the spring element in a direction of the measuring membrane.

8. The sensor arrangement according to claim 7, further comprising a second flange, wherein:
the spring element is configured as a coil spring, and
the coil spring is assigned at a third end to an actuating surface of the actuation device, and at a fourth end to the second flange.

9. The sensor arrangement according to claim 8, wherein the force transfer element lies at a fifth end in the second flange and is assigned at a sixth end to the measuring membrane.

10. The sensor arrangement according to claim 9, wherein the force transfer element at the fourth end abuts the measuring membrane.

11. The sensor arrangement according to claim 8, wherein the first flange and the second flange have a predetermined distance to each other for specifying a maximum displacement path of the force transfer element.

12. The sensor arrangement according to claim 1, wherein the measuring head is cup-shaped and comprises a recess configured to receive the force transfer element in regions.

13. An actuation device of a motor vehicle for specifying a braking and/or acceleration request, comprising at least one sensor arrangement according to claim 1.

14. The actuation device according to claim 13, wherein:
the actuation device has a first housing portion and a second housing portion,
the first housing portion is slidably mounted on the second housing portion in a vertical extension of the second housing portion,
the first housing portion has an actuating surface on a top side facing away from the second housing portion or a cover with the actuating surface arranged at the top side, and
the sensor arrangement is arranged in the second housing portion.

15. The actuation device according to claim 14, wherein:
a partition wall is configured or arranged in the second housing portion,
the force transfer element is slidably guided in a first flange, and
the first flange is fixedly arranged in an opening of the partition wall and connected to the partition wall in a form-fit, force-fit and/or material-fit manner.

16. A motor vehicle, comprising at least one actuation device according to claim 13.

17. The sensor arrangement according to claim 1, wherein the force transfer element is further configured to transfer an actuating force applied to an actuating surface of the actuation device.

18. The sensor arrangement according to claim 1, wherein the measuring membrane abuts the force transfer element at the second end.

19. The sensor arrangement according to claim 1, wherein the force sensor element comprises a strain gauge arrangement sputtered on the measuring membrane and/or designed as a full bridge arrangement.

* * * * *